US 10,691,641 B2

(12) United States Patent
Chiba et al.

(10) Patent No.: US 10,691,641 B2
(45) Date of Patent: Jun. 23, 2020

(54) FILE DETERMINATION DEVICE AND FILE DETERMINATION METHOD

(71) Applicant: FUJITSU LIMITED, Kawasaki-shi, Kanagawa (JP)

(72) Inventors: Tsuguto Chiba, Yokohama (JP); Masafumi Hashiguchi, Numazu (JP); Atsushi Shimano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 181 days.

(21) Appl. No.: 15/493,826

(22) Filed: Apr. 21, 2017

(65) Prior Publication Data

US 2017/0344571 A1  Nov. 30, 2017

(30) Foreign Application Priority Data

May 27, 2016 (JP) .................................. 2016-106657

(51) Int. Cl.
*G06F 16/14* (2019.01)
*G06F 16/13* (2019.01)
*G06F 16/903* (2019.01)

(52) U.S. Cl.
CPC ............ *G06F 16/148* (2019.01); *G06F 16/13* (2019.01); *G06F 16/156* (2019.01); *G06F 16/90344* (2019.01)

(58) Field of Classification Search
CPC ......... G06F 17/30106; G06F 17/30985; G06F 17/30091; G06F 17/30112
See application file for complete search history.

(56) References Cited

U.S. PATENT DOCUMENTS

| 5,873,071 | A | 2/1999 | Ferstenberg et al. |
| 8,065,267 | B2* | 11/2011 | Noda .................... G06F 17/243 |
| | | | 707/609 |
| 2004/0210898 | A1 | 10/2004 | Bergen et al. |
| 2007/0156698 | A1* | 7/2007 | Gebhart ............ G06F 17/30112 |
| 2007/0179996 | A1* | 8/2007 | Azami .................... G06F 16/81 |

(Continued)

FOREIGN PATENT DOCUMENTS

| JP | 2001-525963 A | 12/2001 |
| JP | 2007-293699 | 11/2007 |

(Continued)

OTHER PUBLICATIONS

Japanese Office Action dated Nov. 19, 2019 for corresponding Japanese Patent Application No. 2016-106657 with English Translation, 8 pages.

*Primary Examiner* — Belix M Ortiz Ditren
*Assistant Examiner* — Aryan D Toughiry
(74) *Attorney, Agent, or Firm* — Fujitsu Patent Center

(57) ABSTRACT

A method includes first determining whether a character string related to a specific type, from among types of a plurality of files, is included in attribute information of each of the plurality of files which a process that is being executed refers to or updates, second determining the types of each of the plurality of files using higher priority which is given to a first file than a second file from among the plurality of files, the first file having a first attribute information which includes the character string, the second file having a second attribute information which does not include the character string, and outputting a determination result regarding the types related to the plurality of files.

9 Claims, 22 Drawing Sheets

(56) References Cited

U.S. PATENT DOCUMENTS

| | | | | |
|---|---|---|---|---|
| 2009/0193325 A1* | 7/2009 | Fume | ............... | G06F 16/93 |
| | | | | 715/205 |
| 2014/0181090 A1* | 6/2014 | Homsany | ............ | G06F 17/3053 |
| | | | | 707/723 |
| 2015/0067160 A1* | 3/2015 | Sridhar | ............... | H04L 41/5003 |
| | | | | 709/224 |
| 2017/0123630 A1* | 5/2017 | Yamauchi | ............ | G06F 3/04817 |

FOREIGN PATENT DOCUMENTS

| | | |
|---|---|---|
| JP | 2008-191813 A | 8/2008 |
| JP | 2008-293174 A | 12/2008 |
| JP | 2013-191012 | 9/2013 |
| JP | 2013-191188 A | 9/2013 |
| JP | 2015-133098 A | 7/2015 |

\* cited by examiner

FIG. 8

FIRST MANAGEMENT TABLE

| PROCESS NAME | NUMBER OF FILE IDENTIFIER NUMBERS |
|---|---|
| ~ | ~ |

← T1

SECOND MANAGEMENT TABLE

| PROCESS NAME | FILE PATH | COLLECTION TARGET |
|---|---|---|
| ~ | ~ | ~ |

← T2

THIRD MANAGEMENT TABLE

| PROCESS NAME | CHILD MONITORING PROCESS NAME |
|---|---|
| ~ | ~ |

FIRST MANAGEMENT TABLE

| PROCESS NAME | NUMBER OF FILE IDENTIFIER NUMBERS |
|---|---|
| — | — |

← T1

SECOND MANAGEMENT TABLE

| PROCESS NAME | FILE PATH | COLLECTION TARGET |
|---|---|---|
| — | — | — |

← T2

THIRD MANAGEMENT TABLE

| PROCESS NAME | CHILD MONITORING PROCESS NAME |
|---|---|
| /opt/APP1/PROCESS1 | CHILD MONITORING PROCESS1 |
| /opt/APP2/PROCESS1 | CHILD MONITORING PROCESS2 |

FIRST MANAGEMENT TABLE     T1

| PROCESS NAME | NUMBER OF FILE IDENTIFIER NUMBERS |
|---|---|
| /opt/APP1/PROCESS1 | 2 |
| /opt/APP2/PROCESS2 | 1 |

SECOND MANAGEMENT TABLE     T2

| PROCESS NAME | FILE PATH | COLLECTION TARGET |
|---|---|---|
| — | — | — |

THIRD MANAGEMENT TABLE     T3

| PROCESS NAME | CHILD MONITORING PROCESS NAME |
|---|---|
| /opt/APP1/PROCESS1 | CHILD MONITORING PROCESS1 |
| /opt/APP2/PROCESS2 | CHILD MONITORING PROCESS2 |

FIG. 14

PRIORITY CHECK LIST

| PROCESS NAME | FILE PATH |
|---|---|
| /opt/APP1/PROCESS1 | /var/opt/APP1/error.log |

↙ L1

PRIORITY CHECK LIST

| PROCESS NAME | FILE PATH |
|---|---|
| /opt/APP1/PROCESS1 | /etc/opt/APP1/setting.conf |

FIRST MANAGEMENT TABLE

| PROCESS NAME | NUMBER OF FILE IDENTIFIER NUMBERS |
|---|---|
| /opt/APP1/PROCESS1 | 2 |
| /opt/APP2/PROCESS2 | 1 |

T1

SECOND MANAGEMENT TABLE

| PROCESS NAME | FILE PATH | COLLECTION TARGET |
|---|---|---|
| /opt/APP1/PROCESS1 | /var/opt/APP1/error.log | TARGET |

T2

THIRD MANAGEMENT TABLE

| PROCESS NAME | CHILD MONITORING PROCESS NAME |
|---|---|
| /opt/APP1/PROCESS1 | CHILD MONITORING PROCESS1 |
| /opt/APP2/PROCESS2 | CHILD MONITORING PROCESS2 |

FIRST MANAGEMENT TABLE

| PROCESS NAME | NUMBER OF FILE IDENTIFIER NUMBERS |
|---|---|
| /opt/APP1/PROCESS1 | 2 |
| /opt/APP2/PROCESS2 | 1 |

T1

SECOND MANAGEMENT TABLE

| PROCESS NAME | FILE PATH | COLLECTION TARGET |
|---|---|---|
| /opt/APP1/PROCESS1 | /var/opt/APP1/error.log | TARGET |
| | /etc/opt/APP1/setting.conf | NON-TARGET |

T2

THIRD MANAGEMENT TABLE

| PROCESS NAME | CHILD MONITORING PROCESS NAME |
|---|---|
| /opt/APP1/PROCESS1 | CHILD MONITORING PROCESS1 |
| /opt/APP2/PROCESS2 | CHILD MONITORING PROCESS2 |

FIRST MANAGEMENT TABLE

| PROCESS NAME | NUMBER OF FILE IDENTIFIER NUMBERS |
|---|---|
| /opt/APP1/PROCESS1 | 2 |
| /opt/APP2/PROCESS2 | 1 |

T1

SECOND MANAGEMENT TABLE

| PROCESS NAME | FILE PATH | COLLECTION TARGET |
|---|---|---|
| /opt/APP1/PROCESS1 | /var/opt/APP1/error.log | TARGET |
| /opt/APP1/PROCESS1 | /etc/opt/APP1/setting.conf | NON-TARGET |
| /opt/APP1/PROCESS2 | /var/opt/APP2/errlog | TARGET |
| /opt/APP1/PROCESS2 | /var/opt/APP2/infolog | TARGET |

T2

THIRD MANAGEMENT TABLE

| PROCESS NAME | CHILD MONITORING PROCESS NAME |
|---|---|
| /opt/APP1/PROCESS1 | CHILD MONITORING PROCESS1 |
| /opt/APP2/PROCESS2 | CHILD MONITORING PROCESS2 |

FIRST MANAGEMENT TABLE

| PROCESS NAME | NUMBER OF FILE IDENTIFIER NUMBERS |
|---|---|
| /opt/APP1/PROCESS1 | 2 |
| /opt/APP2/PROCESS2 | 1 |

T1

SECOND MANAGEMENT TABLE

| PROCESS NAME | FILE PATH | COLLECTION TARGET |
|---|---|---|
| /opt/APP1/PROCESS1 | /var/opt/APP1/error.log | TARGET |
| /opt/APP1/PROCESS1 | /etc/opt/APP1/setting.conf | NON-TARGET |
| /opt/APP2/PROCESS2 | /var/opt/APP2/errlog | TARGET |
| /opt/APP2/PROCESS2 | /var/opt/APP2/infolog | TARGET |

T2

THIRD MANAGEMENT TABLE

| PROCESS NAME | CHILD MONITORING PROCESS NAME |
|---|---|
| /opt/APP1/PROCESS1 | CHILD MONITORING PROCESS1 |
| /opt/APP2/PROCESS2 | CHILD MONITORING PROCESS1 |

FIRST MANAGEMENT TABLE

| PROCESS NAME | NUMBER OF FILE IDENTIFIER NUMBERS |
|---|---|
| /opt/APP1/PROCESS1 | 2 |
| /opt/APP2/PROCESS2 | 1 |
| /opt/APP2/PROCESS3 | 1 |

T1

SECOND MANAGEMENT TABLE

| PROCESS NAME | FILE PATH | COLLECTION TARGET |
|---|---|---|
| /opt/APP1/PROCESS1 | /var/opt/APP1/error.log | TARGET |
| | /etc/opt/APP1/setting.conf | NON-TARGET |
| /opt/APP2/PROCESS2 | /var/opt/APP2/errlog | TARGET |
| | /var/opt/APP2/infolog | TARGET |
| /opt/APP3/PROCESS3 | /var/opt/APP3/ERROR LOG.txt | NON-TARGET |

T2

THIRD MANAGEMENT TABLE

| PROCESS NAME | CHILD MONITORING PROCESS NAME |
|---|---|
| /opt/APP1/PROCESS1 | CHILD MONITORING PROCESS1 |
| /opt/APP2/PROCESS2 | CHILD MONITORING PROCESS1 |
| /opt/APP3/PROCESS3 | CHILD MONITORING PROCESS3 |

T3

FILE DETERMINATION DEVICE AND FILE DETERMINATION METHOD

CROSS-REFERENCE TO RELATED APPLICATION

This application is based upon and claims the benefit of priority of the prior Japanese Patent Application No. 2016-106657, filed on May 27, 2016, the entire contents of which are incorporated herein by reference.

FIELD

The embodiment discussed herein is related to a technology of determining a file.

BACKGROUND

There is a technology of determining whether or not a file to which a process that is being executed by a computer refers or which the process updates is a specific type.

For example, in a task of collecting logs that are output by an application process that is executed in an application server or the like, there are cases in which, a file, among a large number of files that are output by the application process, which is considered as a log, is desired to be specified. A log is important information in performing an investigation of a cause when a problem has occurred in an application and, in recent years, as the interest in internal control increases, the importance of collecting logs that are output by an application has increased.

In a task of collecting logs, an output destination (a full path including a file name), a format, a collection destination (a save location for extracted contents), or the like of a log is specified in a collection tool (a product, such as Fluentd, Splunk, or the like). In this case, when there is no change in the output destination of the log or the like, the above-described specification may be performed only once at the beginning but, when a system configuration is changed due to an addition or a modification of an application, a change is made to the output destination or the like of the log and the specification is performed again each time a change is made. Examples of applications include, for example, an open source (OSS), a middleware, a business application, or the like and, in the current situation, the frequency of the occurrence of an addition or a modification of such an application is high, and the system configuration is changed from day to day.

For specification of the output destination or the like of a log, an administrator performs setting with understanding of the specifications of an application, and therefore, in an environment in which a system configuration is changed from day to day, the output destination or the like of the log is frequently checked, and this causes a burden of the system administrator. Therefore, it is desired that files that are output by an application are automatically monitored and a file that is considered as a log is automatically specified.

FIG. 1 is a diagram illustrating an example of monitoring of a file that is output by an application according to related art and illustrates an example in which files of a plurality of app processes (application processes) are monitored by a single monitoring process. In this case, the monitoring process checks files one by one from a file list of each app process and determines, if a character string, such as "log" or the like, is included in a file name or an extension, that a file is a log.

FIG. 2 is a diagram illustrating another example of monitoring of a file that is output by an applicant according to related art and illustrates an example in which each of files of app processes is monitored by the corresponding one of monitoring processes. In this case, each monitoring process checks files one by one from a file list of the corresponding app process and determines, if a character string, such as "log" or the like, is included in a file name or an extension, that a file is a log.

Japanese Laid-open Patent Publication No. 2013-191012 discusses a computer log collecting system which collects logs that are output by an application. In this case, determination on whether or not a file is a log is sequentially performed on all files that exist in an application storage area.

SUMMARY

According to an aspect of the invention, a method includes first determining whether a character string related to a specific type, from among types of a plurality of files, is included in attribute information of each of the plurality of files which a process that is being executed refers to or updates, second determining the types of each of the plurality of files using higher priority which is given to a first file than a second file from among the plurality of files, the first file having a first attribute information which includes the character string, the second file having a second attribute information which does not include the character string, and outputting a determination result regarding the types related to the plurality of files.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating examples of management tables;

FIG. 10 is a diagram illustrating examples of management tables;

FIG. 12 is a diagram illustrating examples of management tables;

FIG. 14 is a diagram illustrating a priority check list and a non-priority check list;

FIG. 16 is a diagram illustrating examples of management tables;

FIG. 17 is a diagram illustrating examples of management tables;

FIG. 18 is a diagram illustrating examples of management tables;

FIG. 20 is a diagram illustrating examples of management tables;

FIG. 22 is a diagram illustrating examples of management tables.

DESCRIPTION OF EMBODIMENT

Conventionally, files that are to be targets are sequentially set as determination targets in a unified manner, and therefore, when a number of files that are not logs are in high ranks of the processing order, a problem arises in which it takes a time to find a log. Note that, although the description above has been given using logs as an example, similar applies to a case in which a file of some other type is specified.

Therefore, in one aspect, it is an object of the present disclosure to enable preferentially setting a file that is highly likely to be a specific type as a target file of type determination.

A preferred embodiment will be described below.

<Configuration>

Figure 1:
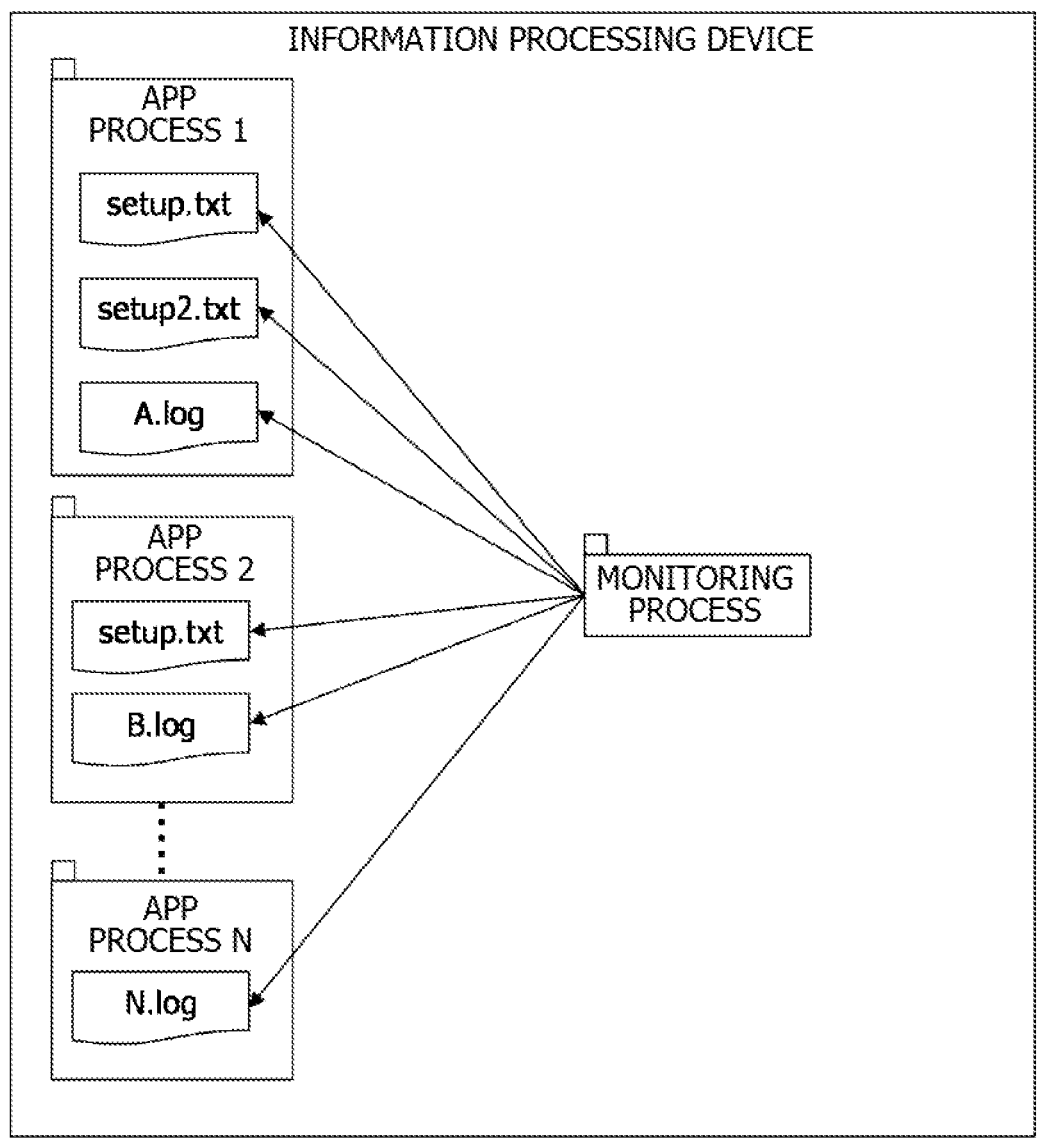
FIG. 1 is a diagram illustrating a first example of monitoring of a file that is output by an application in accordance with related art.
Figure 2:
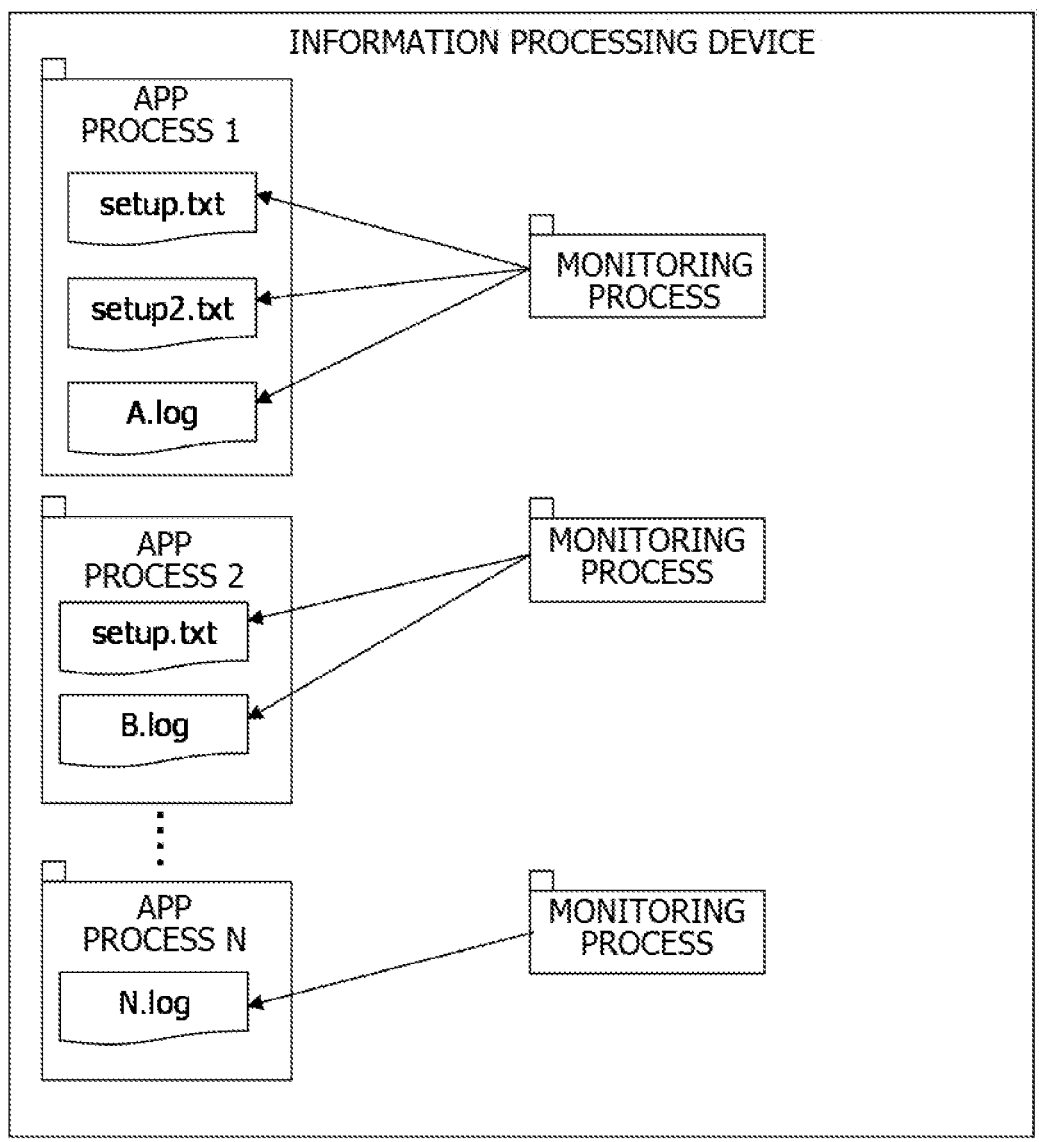
FIG. 2 is a diagram illustrating a second example of monitoring of a file that is output by an application in accordance with related art.
Figure 3:
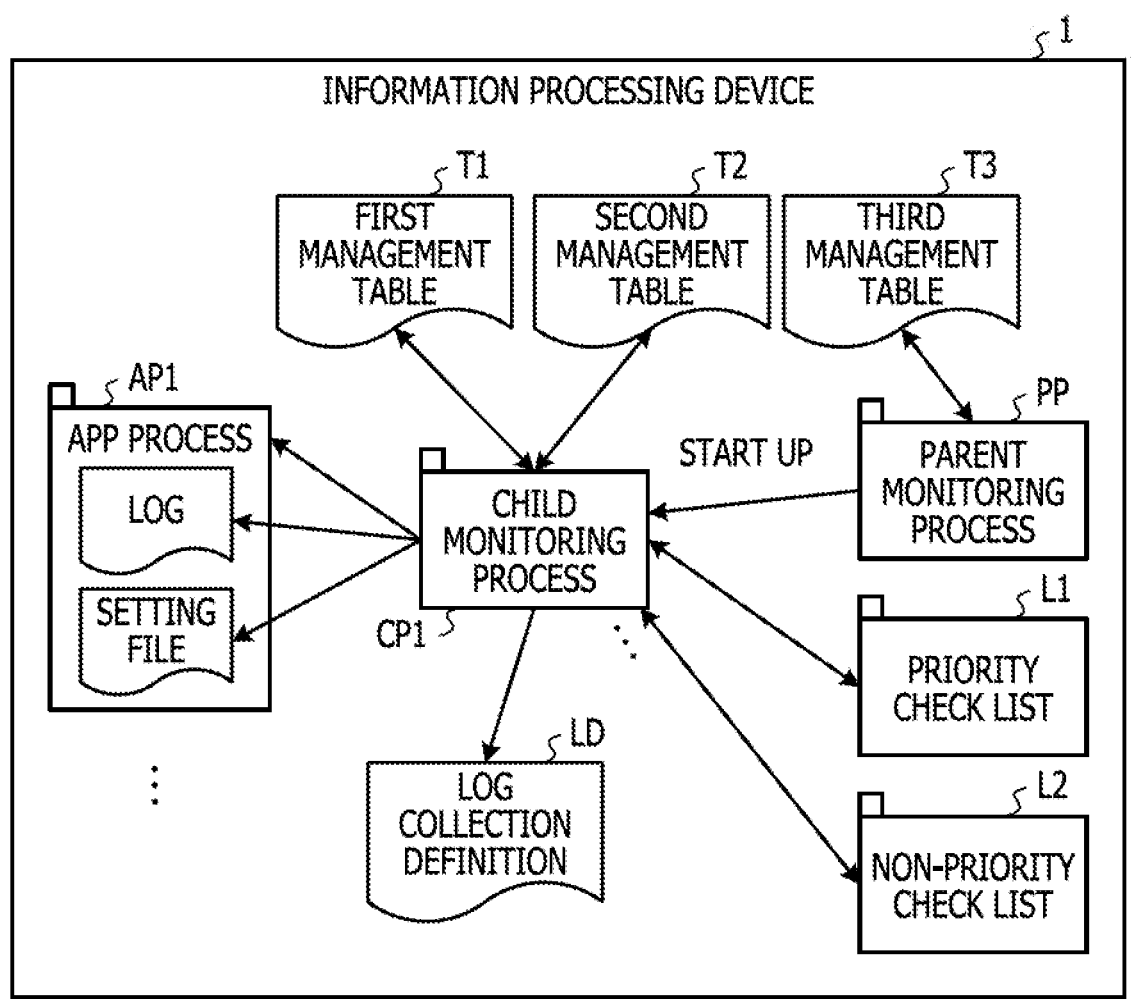
FIG. 3 is a diagram illustrating a functional configuration example of an information processing device.

FIG. 3 is a diagram illustrating a functional configuration example of an information processing device 1. In FIG. 3, in the information processing device 1, an arbitrary number of app processes (application processes) AP1, ... are executed, and the app processes AP1, ... refer to and update logs or setting files. As a mechanism of monitoring whether or not the files to which the app processes AP1, ... refer or which the app processes AP1, ... update are logs, that is, whether or not the files are a specific type, which is "log", a parent monitoring process PP and a desired number of child monitoring processes CP1, ... are provided. The child monitoring processes CP1, ... are started up by the parent monitoring process PP and, except for a representative child monitoring process, that is, for example, the child monitoring process CP1, when each of the child monitoring processes terminates a first round of predetermined processing, the each of the child monitoring processes hands over the processing to the representative child monitoring process and then ends. As data used when processing of monitoring is performed, a first management table T1, a second management table T2, a third management table T3, a priority check list L1, a non-priority check list L2, a log collection definition (a log output destination definition) LD, or the like is provided.

The first management table T1 holds the number of file identifier numbers (which corresponds to the number of files that are opened) for each app process. An app process does not close a file that has been once opened, and therefore, appearance of a new file may be detected based on an increase in the number of file identifier numbers. The second management table T2 holds a file path of a file that is being used for each app process and also holds a result of determination on whether or not the file is a collection target. The Third management table T3 holds the process name of an app process and the child monitoring process name of a child monitoring process that performs monitoring on the app process as a target. Each of specific examples of the tables will be described later.

The priority check list L1 holds the process name and file path of an app process that has been determined to be highly likely to be a log and to be preferentially processed by a simple check by file name in a child monitoring process. The non-priority check list L2 holds the process name and file path of an app process that has not been determined to be preferentially processed. Each of specific examples of the lists will be described later. The log collection definition LD holds the process name and file path of an app process that has been determined as a log, and is used by an administrator that collects logs.

Figure 4A:
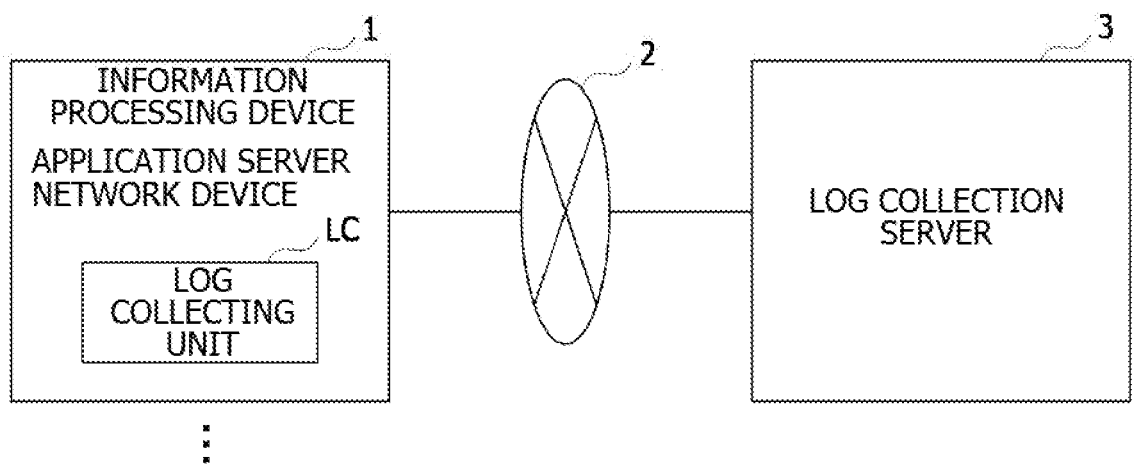
FIGS. 4A and 4B are diagrams each illustrating a configuration example of a log collecting system.
Figure 4B:
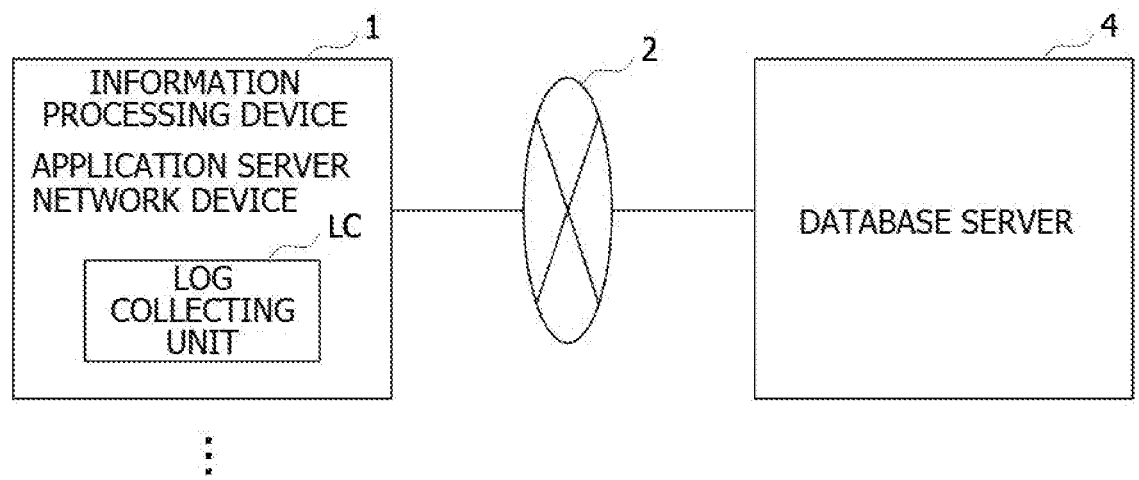

FIGS. 4A and 4B are diagrams each illustrating a configuration example of a log collecting system. In FIG. 4A, the information processing device 1 that is a log collection target is an application server or a network device. Under management of a log collection server 3 coupled to the information processing device 1 via a network 2, logs are collected by a log collecting unit LC and the collected logs are transmitted to the cloud server 3. The log collecting unit LC performs, based on the log collection definition LD that is automatically generated by a child monitoring process of the information processing device 1 and information that has been set by the administrator, collection of logs (which is collection of all of contents or specified contents of files).

In FIG. 4B, instead of the log collection server 3, a database server 4 is used, the log collecting unit LC of the information processing device 1 collects logs, based on the log collection definition and information that has been set by the administrator, and transmits collected logs to the database server 4 to store the collected logs in the database server 4.

Figure 5:
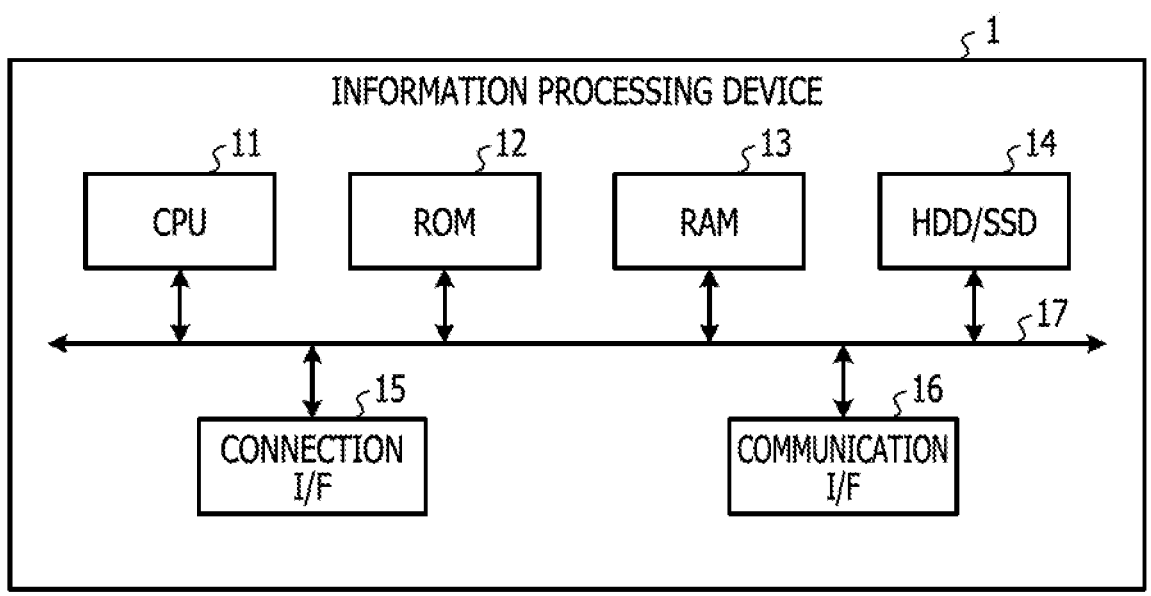
FIG. 5 is a diagram illustrating a hardware configuration example of an information processing device.

FIG. 5 is a diagram illustrating a hardware configuration example of the information processing device 1. In FIG. 5, the information processing device 1 includes a central processing unit (CPU) 11, read only memory (ROM) 12, and random access memory (RAM) 13, which are mutually coupled to one another via a bus 17. Also, the information processing device 1 includes a hard disk drive (HDD)/solid state drive (SSD) 14, a connection interface (I/F) 15, and a communication I/F 16. The CPU 11 executes, assuming that the RAM 13 is a work area, a program stored in the ROM 12, the HDD/SSD 14, or the like, and thereby, integrally controls an operation of the information processing device 1. The connection I/F 15 is an interface with a device that is coupled to the information processing device 1. The communication I/F 16 is an interface that is used for performing a communication with another information processing device via a network.

Functions of the information processing device 1 illustrated in FIG. 3 are realized by execution of a predetermined program in the CPU 11. The program may be acquired via a recording medium, may be acquired via a network, and may be embedded in ROM. Data to which is referred and which is updated when processing is performed is held in the RAM 13 or the HDD/SSD 14.

<Operation>

An operation according to the above-described embodiment will be described below with reference to a flowchart. In addition to general processing in accordance with the flowchart, a specific example will be described. In the following specific example, at the time of startup of the parent monitoring process PP, two applications, that is, an application 1 and an application 2, are being executed and, after a first round of processing in each of the child monitoring process CP1 and the child monitoring process CP2 that correspond to the application 1 and the application 2 is terminated, an application 3 is newly executed. Note that each of the applications uses one of the following files.

Application 1 (process 1)
  Output file name 1: setting.conf (Date and time information is not included in a file.)
  Output file name 2: error.log (Date and time information is included in a file.)
Application 2 (process 2)
  Output file name 1: errlog (Date and time information is included in a file)
  Output file name 2: infolog (A file that is normally not output but, when some kind of operation is performed, is output. Date and time information is included in a file.)
Application 3 (process 3)
  Output file name 1: ERROR LOG.txt (Date and time information is not included in a file.)

[Processing of Parent Monitoring Process]

Figure 6:
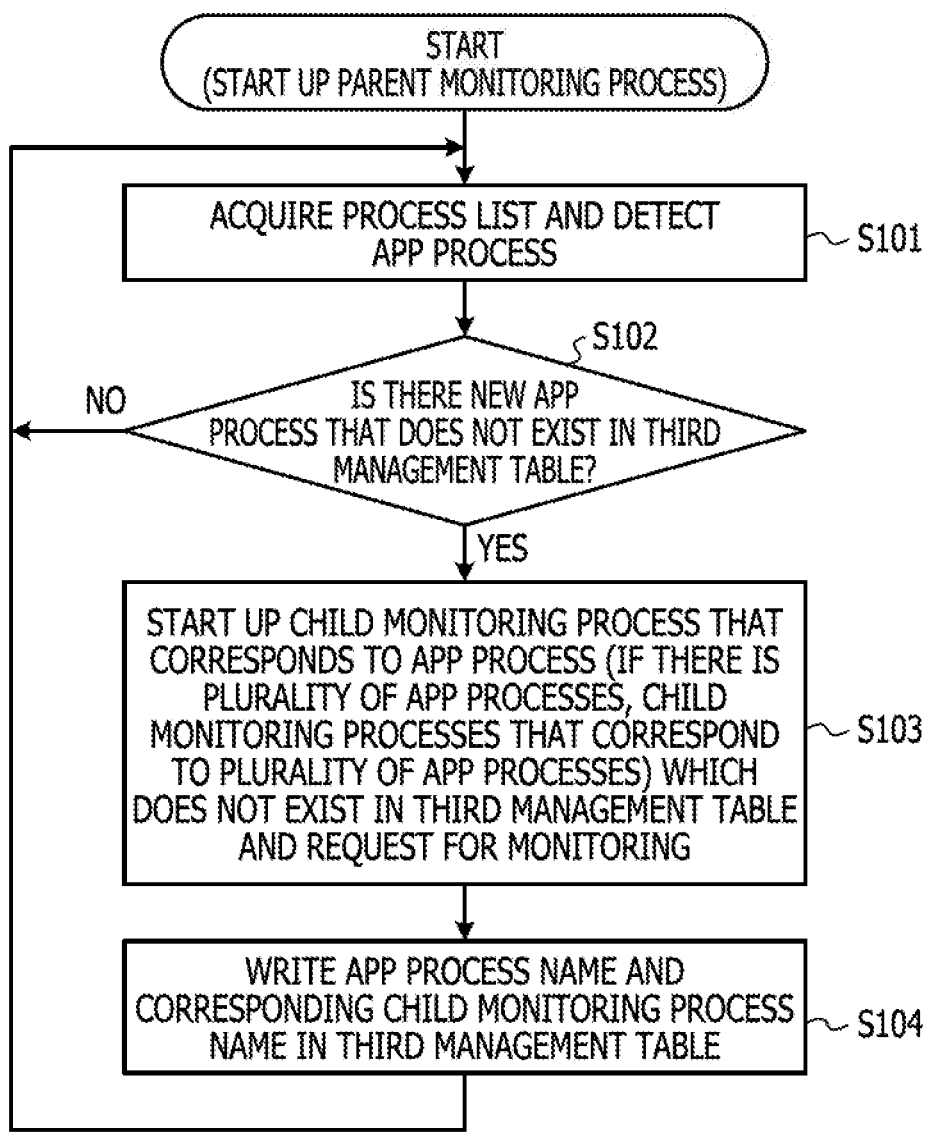
FIG. 6 is a flowchart illustrating a processing example of a parent monitoring process.

FIG. 6 is a flowchart illustrating a processing example of the parent monitoring process PP. In FIG. 6, when the parent monitoring process PP is started up, based on an instruction from the administrator, an instruction based on automatic startup setting, or the like, the parent monitoring process PP starts processing. At this time point, there is no child monitoring process yet.

Figure 7:
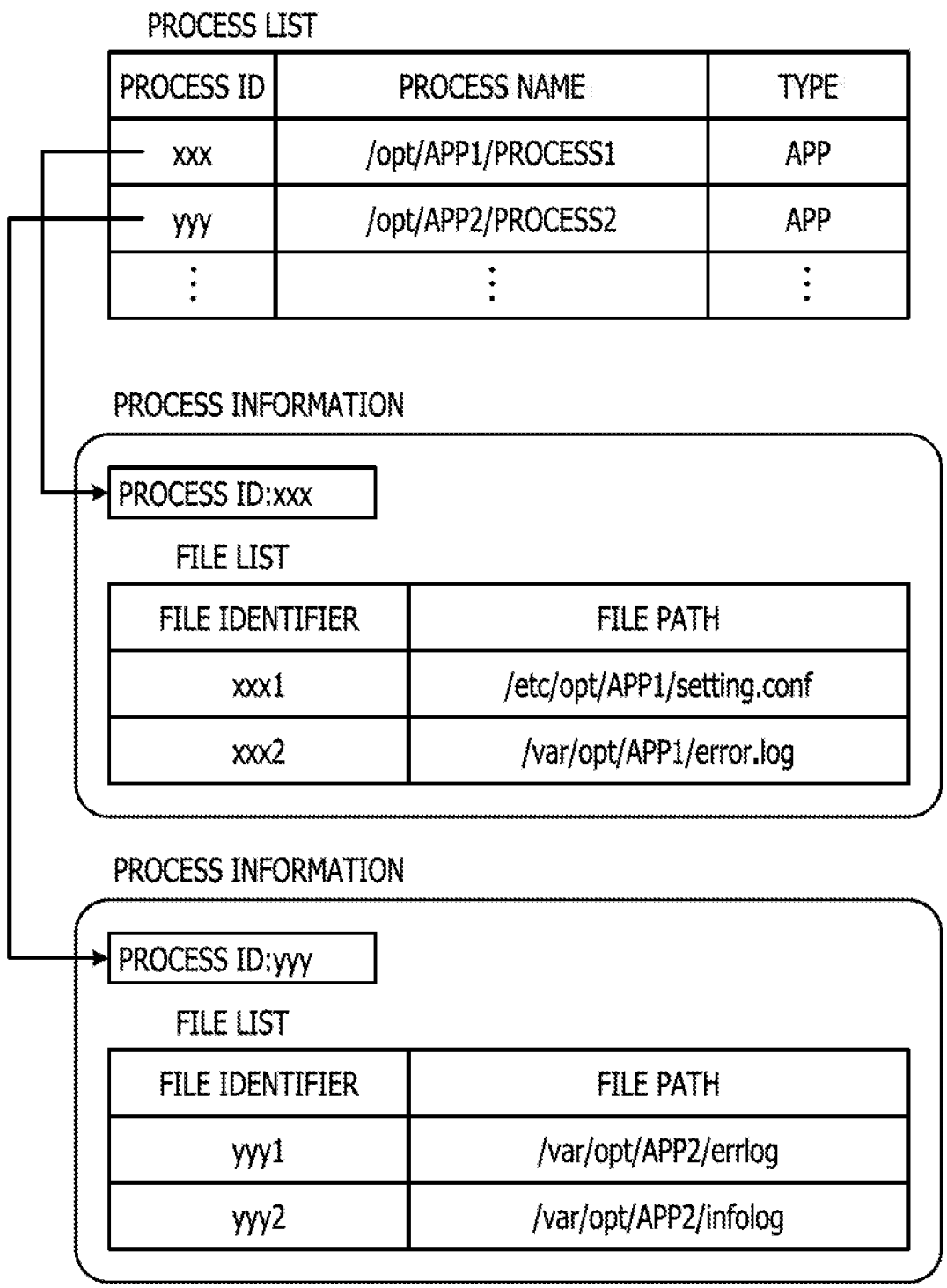
FIG. 7 is a diagram illustrating an example of a process list and processing information.

The parent monitoring process PP acquires a process list from the operating system (OS) of the information processing device 1 and detects an app process (Step S101). FIG. 7 is a diagram illustrating an example of a process list, the process list includes the process name and type of a process that is being executed, and an app process may be identified based on the type. In this case, as described above, at the time of startup of the parent monitoring process PP, assuming that two applications, that is, the application 1 and the application 2, are being executed, the process 1 and the process 2 of the application 1 and the application 2 are detected as app processes. Note that a process ID is given to each process (process name) of the process list and process information is acquired, from the OS, based on the process ID. The process information includes a file list that is used by the corresponding process and a file identifier and a file path may be acquired from the file list.

Returning to FIG. 6, the parent monitoring process PP refers to the third management table T3 for each detected app process and determines whether or not there is a new app process that does not exist in the third management table T3 (Step S102). If the parent monitoring process PP has determined that there is not a new app process (NO in Step S102), the parent monitoring process PP causes the process to return to processing of detection of an app process (Step S101). If the two applications, that is, the application 1 and the application 2, which are illustrated in FIG. 7, have been detected, each of the management tables T1 to T3 at this time point (immediately after a startup) is blank, and therefore, it is determined that both of the two app processes are new.

Figure 9:
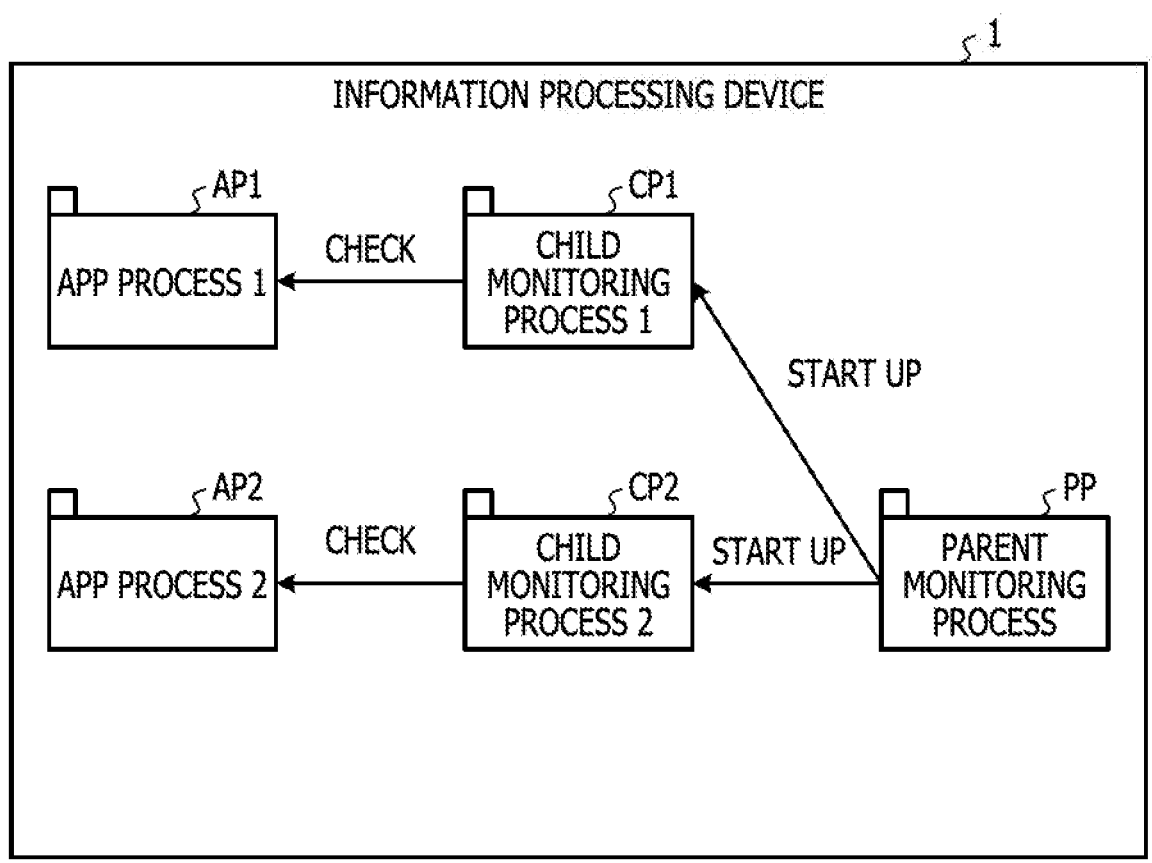
FIG. 9 is a diagram illustrating an example of a state in which a child monitoring process is started up.

Returning to FIG. 6, if the parent monitoring process PP has determined that there is a new app process (YES in Step S102), the parent monitoring process PP starts up a child monitoring process that corresponds to an app process (if there is a plurality of app processes, each of child monitoring processes that correspond to the plurality of app processes) which does not exist in the third management table T3. Then, a request for monitoring each app process is made to the corresponding child monitoring process (Step S103). FIG. 9 corresponds to a specific example and illustrates a state in which the parent monitoring process PP started up the child monitoring processes CP1 and CP2 and requested the child monitoring process CP1 and the child monitoring process CP2 to check (monitor) the application 1 (the process 1) and the application 2 (the process 2), respectively.

Returning to FIG. 6, the parent monitoring process PP writes an app process name and the child monitoring process name of a child monitoring process that is responsible for monitoring in the third management table T3 (Step S104) and returns to processing of detecting an app process (S101). FIG. 10 corresponds to a specific example and illustrates a state in which information of the app processes 1 and 2 and the child monitoring processes CP1 and CP2 that are responsible for monitoring in the third management table T3.

[Processing of Child Monitoring Process]

Figure 11:
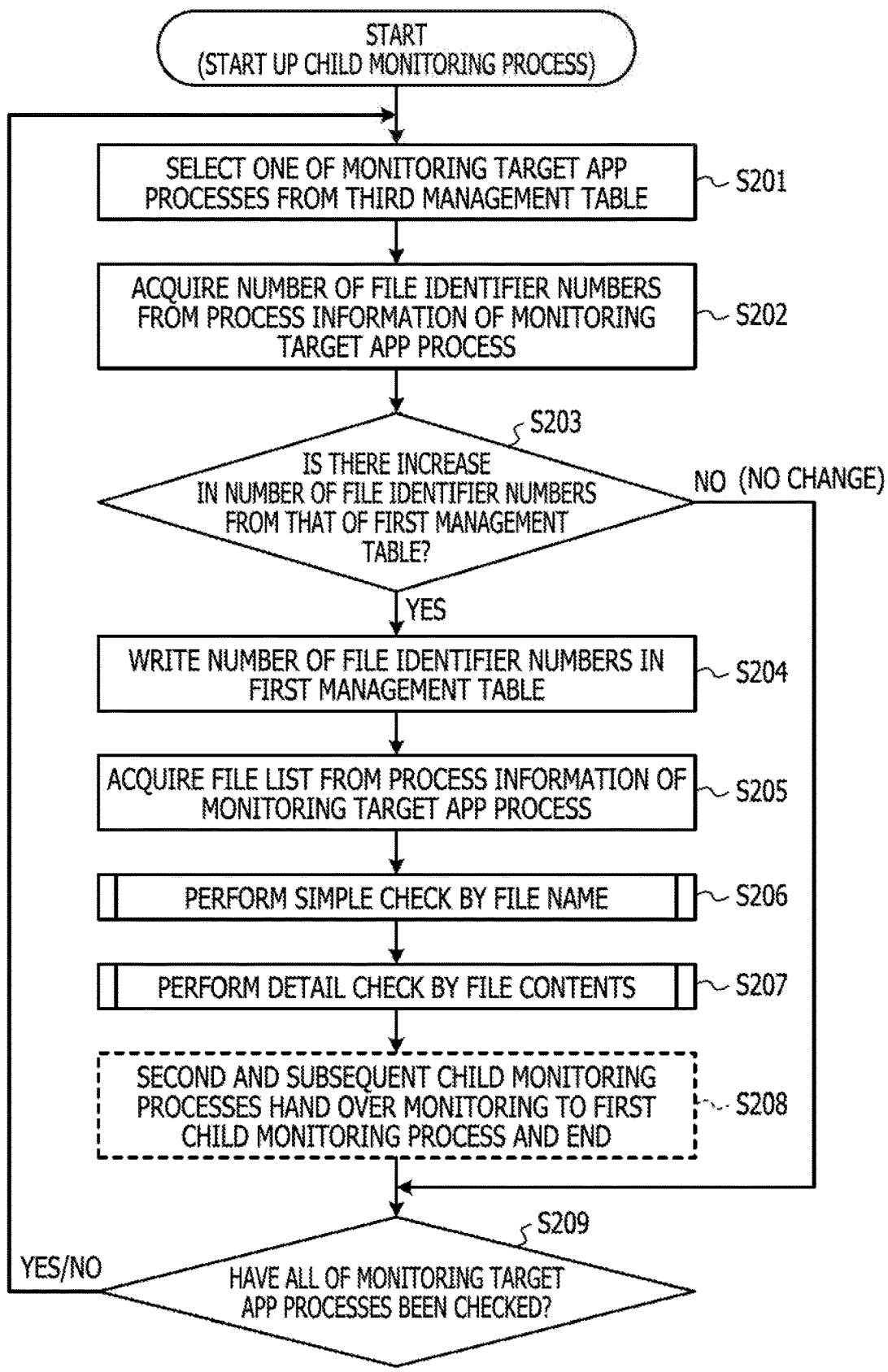
FIG. 11 is a flowchart illustrating a processing example of a child monitoring process.

FIG. 11 is a flowchart illustrating a processing example of a child monitoring process (CP1, CP2, . . . ). In FIG. 11, a child monitoring process that has been started up by the parent monitoring process PP starts the following processing.

The child monitoring process selects one of app processes that are targets of monitoring that is performed by the child monitoring process itself from the third management table T3 (Step S201) and acquires the current number of file identifier numbers from the process information of the app process (Step S202). In accordance with the specific example, based on the third management table T3 illustrated in FIG. 10, the child monitoring process CP1 recognizes that the child monitoring process CP1 is responsible for the process 1 and acquires the number of the file identifier numbers, that is, "2", which corresponds to two file identifiers in the process information of the process 1 illustrated in FIG. 7. Similarly, the child monitoring process CP2 recognizes that the child monitoring process CP2 is responsible for the process 2 and acquires the number of file identifier numbers, that is, "1", because infolog of the two file identifiers in the process information is not counted.

Returning to FIG. 11, the child monitoring process determines, for the current number of file identifier numbers, which has been acquired, whether or not there has been an increase from the number of the file identifier numbers of the first management table T1 (Step S203). If there has been no change in the number of file identifier numbers (NO in Step S203), the process proceeds to determination (Step S209) on whether or not all of app processes that are monitoring targets have been checked.

If it is determined that there has been an increase in the number of file identifier numbers (YES in Step S203), the child monitoring process writes the number of file identifier numbers in the first management table T1 (Step S204). In the first management table T1 illustrated in FIG. 12, which corresponds to a specific example, a state in which each of the child monitoring process CP1 and the child monitoring process CP2 wrote the number of file identifier numbers in the first management table T1 is illustrated.

Returning to FIG. 11, the child monitoring process acquires the file list from the process information of an app process that is a monitoring target (Step S205) and performs a simple check by file name (Step S206).

Figure 13:
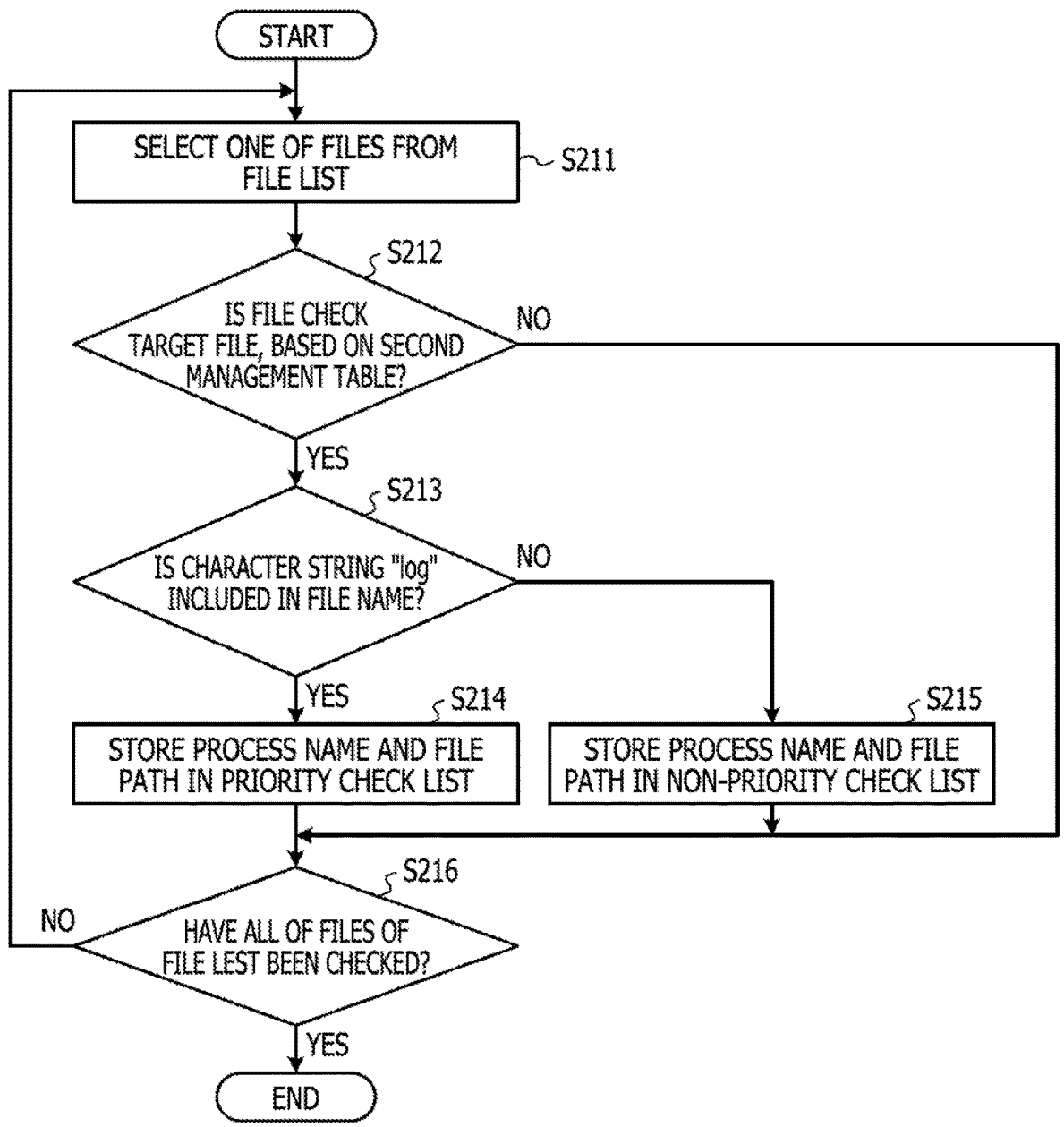
FIG. 13 is a flowchart illustrating a processing example of a simple check by file name.

FIG. 13 is a flowchart illustrating a processing example of a simple check by file name (Step S206 in FIG. 11). In FIG. 13, the child monitoring process selects one of the files from the file list (Step S211) and determines whether or not the file is a check target file, based on the second management table T2 (Step S212). That is, assuming that the file stored in the second management table T2 has been checked and is not a monitoring target, the child monitoring process determines that a file that is not stored in the second management table T2 is a monitoring target. In the specific example, as illustrated in FIG. 12, the second management table T2 to which the child monitoring processes CP1 and CP2 refer at this time point is blank, and therefore, it is determined that all of the files are check target files.

Returning to FIG. 13, if the child monitoring process has determined that the file is a check target file (YES in Step S212), the child monitoring process determines whether or not a character string "log" is included in a file name (including an extension) (Step S213). If the child monitoring process has determined that the character string "log" is included in the file name (YES in Step S213), the child monitoring process stores a process name and a file path in the priority check list L1 (Step S214). If the child monitoring process has determined that the character string "log" is not included in the file name (NO in Step S213), the child monitoring process stores the process name and the file path in the non-priority check list L2 (Step S215). In the specific example, the child monitoring process CP1 determines that the character string "log" is not included in setting.conf of the file list of the process 1 illustrated in FIG. 7 and has determined that the character string "log" is included in error.log. FIG. 14 illustrates a state in which a file path of error.log is stored in the priority check list L1 and a file path of setting.conf is stored in the non-priority check list L2.

Returning to FIG. 13, if the child monitoring process has determined that the file is not a check target file (NO in Step S212) and after the child monitoring process stores the process name and the file path in the priority check list L1 or the non-priority check list L2 (Step S214 and S215), the child monitoring process determines whether or not all of the files of the file list have been checked (Step S216). If the child monitoring process has determined that all of the files of the file list have not been checked (NO in Step S216), the process returns to selection of a file (Step S211) and, if the child monitoring process has determined that all of the files of the file list have been checked (YES in Step S216), the process ends.

Using the above-described algorithm of a simple check by file name, files that are check targets may be sorted into the priority check list L1 and the non-priority check list L2.

Returning to FIG. 11, the child monitoring process subsequently performs a detail check by file contents (Step S207).

Figure 15:
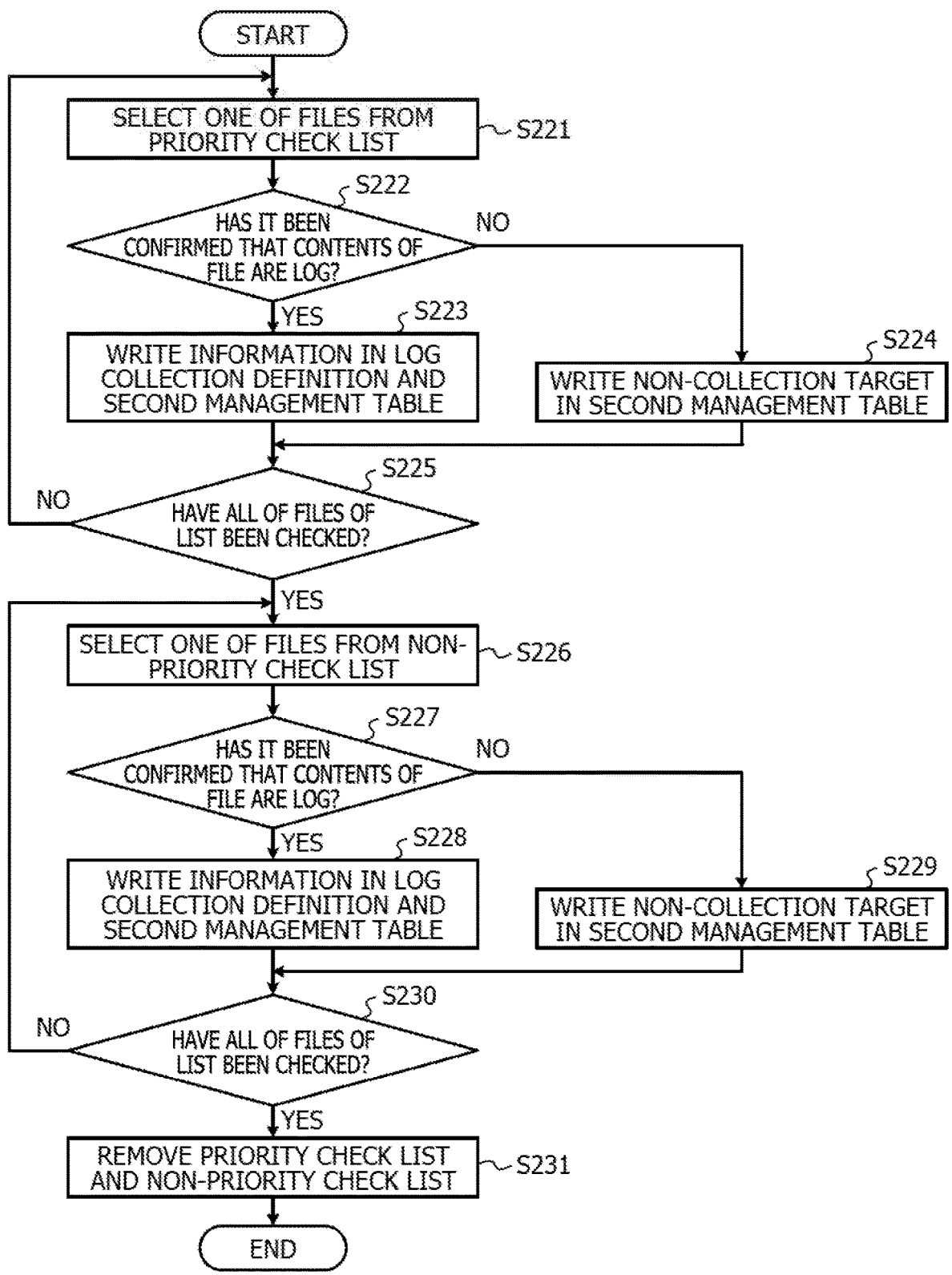
FIG. 15 is a flowchart illustrating a processing example of a detail check by file contents.

FIG. 15 is a flowchart illustrating a processing example of a detail check by file contents (S207 in FIG. 11). In FIG. 15, the child monitoring process selects one of the files from the priority check list L1 (Step S221), analyzes the contents of the file, and checks whether or not the contents of the file are a log (Step S222). For example, for the first line of the file+one line and subsequent lines (the second and subsequent lines), the child monitoring process checks the contents of the file, checks whether or not there are two or more parts in which a character string indicating date and time continues in two lines, and, if so, specifies that the file is a log. Although there is a case in which data and time information is included in a setting file or the like and, if data and time information exists only in one part, there is a probability that an error occurs in determination, the accuracy of determination is increased by considering continuity and repeatability of date and time information, except for a header line.

If the child monitoring process has confirmed that the file is a log (YES in Step S222), the child monitoring process writes information in the log collection definition LD and the second management table T2 (Step S223). The child monitoring process writes the process name and the file path in the log collection definition LD. The child monitoring process writes the process name, the file path, and a collection target: "target" are written in the second management table T2. If the child monitoring process has not confirmed that the file is a log (NO in Step S222), the child monitoring process writes the process name, the file path, the collection target: "non-target" in the second management table T2 (Step S224). For a file written in the second management table T2, whether or not the file is a collection target (target, non-target), a check is not performed in next processing and subsequent processing.

FIG. 16 illustrates a state in which the child monitoring process CP1 in the specific example confirmed that a file error.log stored in the priority check list L1 illustrated in FIG. 14 is a log and wrote the process name, the file path, and the collection target: "target" in the second management table T2.

Returning to FIG. 15, the child monitoring process determines whether or not all of the files of the priority check list L1 have been checked (Step S225), if all of the files of the priority check list L1 have not been checked, the process returns to selection of a next file (Step S221), and, if checks of all of the files of the priority check list L1 are completed, the process proceeds to next processing.

Subsequently, the child monitoring process selects one of the files from the non-priority check list L2 (Step S226), analyzes the contents of the file, and checks whether or not the contents of the file are a log (Step 227). A method for performing a check is similar to that in a case in which a check for the priority check list L1 is performed.

If the child monitoring process has confirmed that the contents of the file are a log (YES in Step S227), the child monitoring process writes information in the log collection definition LD and the second management table T2 (Step S228). The child monitoring process writes the process name and the file path in the log collection definition LD. The child monitoring process writes the process name, the file path, and the collection target: "target" in the second management table T2.

If the child monitoring process has not confirmed that the contents of the file are a log (NO in Step S227), the child monitoring process writes the process name, the file path, and the collection target: "non-target" in the second management table T2 (Step S229).

FIG. 17 illustrates a state in which the child monitoring process CP1 has confirmed that the file setting.conf stored in the non-priority check list L2 is not a log and wrote the process name, the file path, and the collection target: "non-target" in the second management table T2.

Returning to FIG. 15, the child monitoring process determines whether or not all of the files of the non-priority check list L2 have been checked (Step S230). If all of the files of the non-priority check list L2 have not been checked, the process returns to selection of a next file (Step S226) and, if all of the files of the non-priority check list L2 have not been checked, removes the priority check list L1 and the non-priority check list L2 (Step S231), and the process ends.

FIG. 18 illustrates a state in which, in a specific example, writing to the second management table T2 was performed by the child monitoring processes CP1 and CP2 which operate in parallel.

The first round of check processing is completed by the above-described processing. In this case, a check is preferentially performed on a file that is highly likely to be a log, and therefore, a log may be quickly specified. Also, for a file that is not highly likely to be a log, the order of priority is lowered but a check is reliably performed on the file, so that omission in determination is not caused.

Returning to FIG. 11, if a plurality of child monitoring processes has been started up, due to termination of the first round of processing of a simple check and a detail check, the second and subsequent child monitoring processes hand over monitoring to the first child monitoring process serving as a representative, and then, ends (Step S208). That is, a plurality of app processes is grouped and monitoring of the group is performed by a single child monitoring process. Note that, instead of handing over monitoring to the first child monitoring process, a representative child monitoring process at that time point may be set based on some kind of reference, and monitoring may be handed over to the child monitoring process. The handing over is performed by changing the process name of the child monitoring process that is to end to the process name of the child monitoring process to which the monitoring is handed over.

Figure 19:
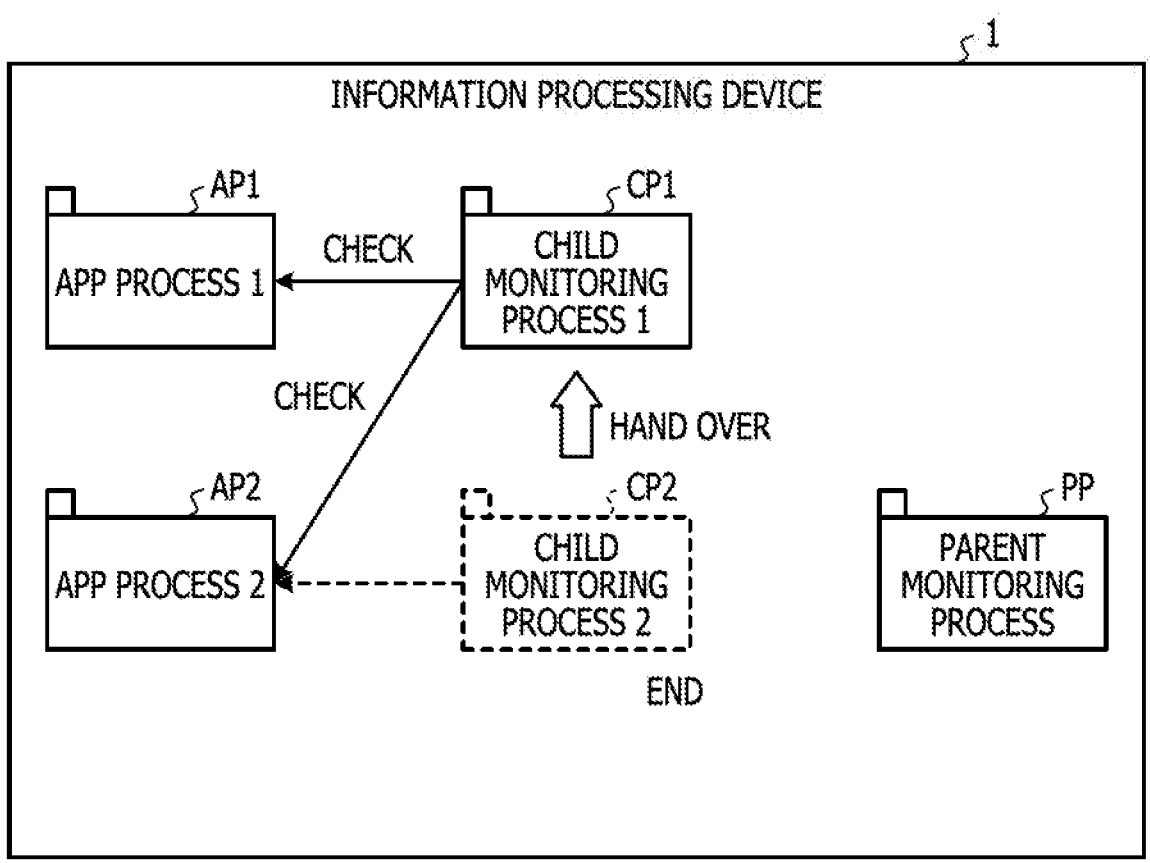
FIG. 19 is a diagram illustrating an example of a state in which a child monitoring process is terminated.

FIG. 19 illustrates a state in which, in a specific example, in the case in which the child monitoring processes CP1 and CP2 operated, the child monitoring process CP2 handed over monitoring for an app process AP2 to the child monitoring process CP1 and then ended. FIG. 20 illustrates tables after monitoring was handed over and the child monitoring process name of the child monitoring process for the process 2 of the third management table T3 was changed from the previous child monitoring process 2 to the child monitoring process 1 (FIG. 18).

A processing load is increased immediately after monitoring of a new app process was started, and therefore, processing of allocating an exclusive child monitoring process to each app process, thereby increasing efficiency of processing. However, if the first round of processing has ended for the app process, thereafter, processing is performed only on a file that has been newly generated, and therefore, the exclusive child monitoring process is hardly desired to be provided. Thus, grouping of app processes is performed and a plurality of app processes is caused to correspond to a single child monitoring process to reduce the number of child monitoring processes, so that process multiplicity is not increased too high and a load on the system is not caused to be increased.

Returning to FIG. 11, the child monitoring process determines whether or not all of app processes (if an app process was newly started up, a single app process and, if app processes are grouped, a plurality of app processes) which are monitoring targets have been checked (Step S209). Then, if all of the app processes have not been checked, for a next app process, processing is repeated from initial processing (Step S201) and, if all of the processes have been checked, for the first app process, processing is repeated as a second round from initial processing (Step S201).

Figure 21:
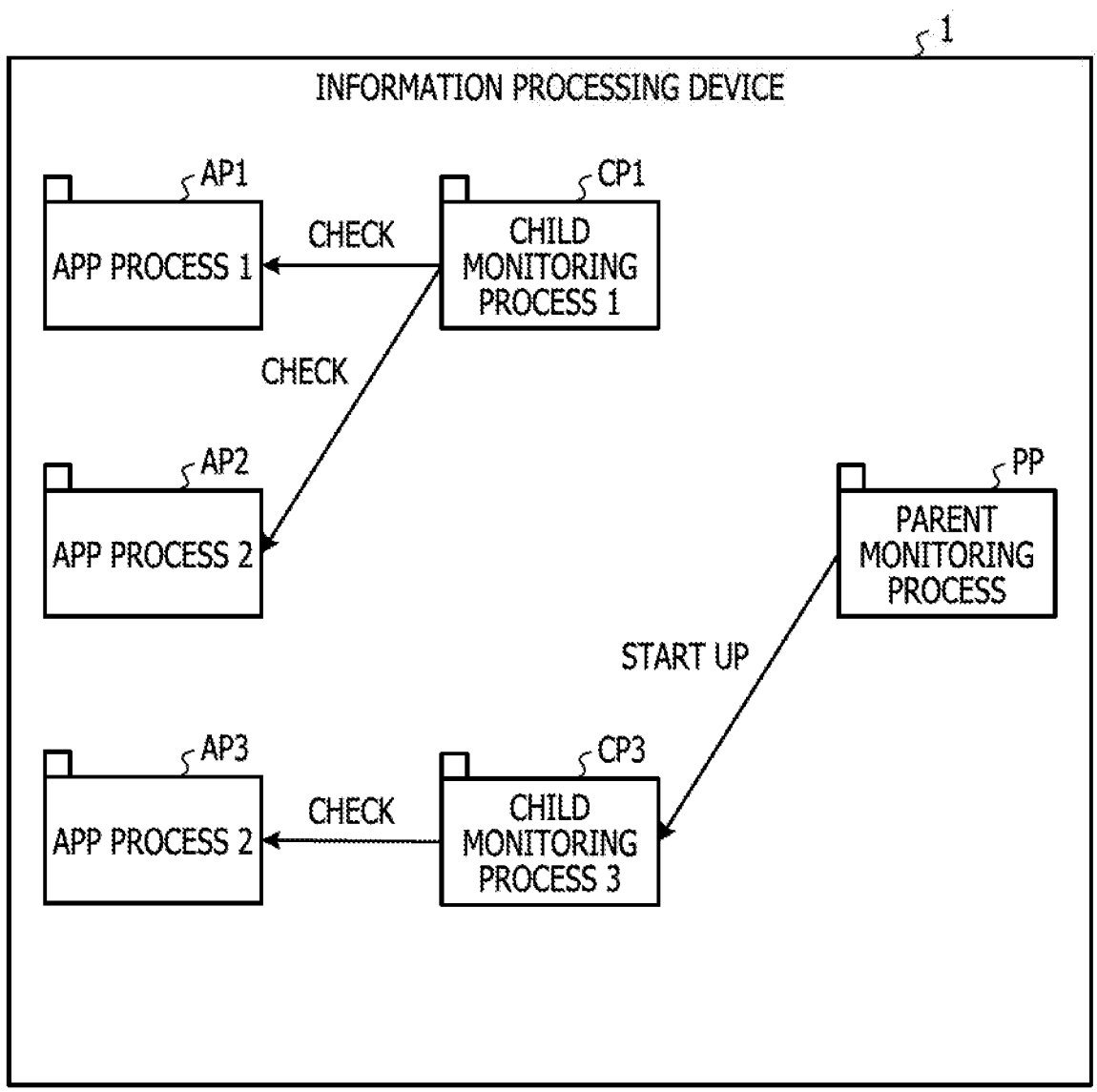
FIG. 21 is a diagram illustrating an example of a state in which a child monitoring process is started up.

FIG. 21 illustrates a state in which, in a specific example, after the first round of processing for the app processes AP1 and AP2 ended and the app processes were grouped, a new app process AP3 was executed, and thereby, a child monitoring process CP3 corresponding to the app process AP3 was newly stated up.

FIG. 22 illustrates a state in which a check by the child monitoring process CP3 was performed and check results for the app processes AP1, AP2, and AP3 were stored in the second management table T2. For a file the collection target of which is "target" in the second management table T2, the process name and the file path are written out as the log collection definition LD, and therefore, the administrator of log collection is capable of properly performing setting on a collection tool, based on the log collection definition LD.

SUMMARY

As has been described above, according to this embodiment, a file that is highly likely to be a specific type may be preferentially set as a target file of type determination.

Also, for a new app process, check processing may be efficiently performed by allocating an exclusive child monitoring process.

Also, if the first round of processing has ended, a child monitoring process hands over monitoring to a representative child monitoring process and then ends, so that multiplicity of monitoring process is not increased too high and a load on the system may be caused to be at a proper level.

A preferred embodiment has been described above. Although certain specific examples has been described herein, it is clear that various modifications and changes may be made to the specific examples without departing from the wide gist and scope of the present disclosure as set forth in the claims. That is, it is not to be understood that the present disclosure is limited to the details of the specific example and the accompanying drawings.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed by a computer, the method comprising: first determining whether a character string, which is log, is included in attribute information of each of a plurality of files which are referred to or updated by a process that is being executed; classifying the plurality of files into a first group of one or more files having the attribute information including the character string and a second group of one or more files not having the attribute information including the character string; second determining whether a type of each of the one or more files of the first group is log by analyzing content of each of the one or more files of the first group prior to the second group; and outputting a determination result of the second determining regarding the types of the plurality of files, wherein the second determining determines whether there are two or more parts in which another character string indicating date and time is provided in two continuous lines in the content of each of the one or more files of the first group, and wherein, when determining that the two or more parts exit in the content of one file of the one or more files of the first group, the second determining determines that the type of the one file is log.

2. The method according to claim 1, wherein the attribute information indicates where each of the plurality of files exists.

3. The method according to claim 1, further comprising:
   storing separately the first group of the one or more files and the second group of the one or more files; and
   third determining whether a type of each of the one or more files of the second group is log by analyzing content of each of the one or more files of the second group after the second determining for the first group of one or more files.

4. The method according to claim 1, further comprising: storing the determination result in accordance with the process.

5. The method according to claim 1, further comprising:
   causing a plurality of monitoring processes to execute, for each of a plurality of processes including the process, a procedure including the first determining and the second determining, wherein a first monitoring process for which a first round of the processing has ended is handed over to a second monitoring process and the second monitoring process executes new processing, and wherein the new processing including new first determining and new second determining.

6. The method according to claim 5, wherein, when an increase in a number of a file identifier of one of the processes for which the second monitoring process is responsible is detected, the new processing is started.

7. The method according to claim 1, wherein the attribute information is a file name.

8. A non-transitory computer-readable storage medium storing a program which causes a computer to execute a procedure, the procedure comprising: first determining whether a character string, which is log, is included in attribute information of each of the plurality of files which are referred to or updated by a process that is being executed; classify the plurality of files into a first group of one or more files having the attribute information including the character string and a second group of one or more files not having the attribute information including the character string; second determining whether a type of each of the one or more files of the first group is log by analyzing content of each of the one or more files of the first group prior to the second group; and outputting a determination result of the second determining regarding the types of the plurality of files, wherein the second determining determines whether there are two or more parts in which another character string indicating date and time is provided in two continuous lines in the content of each of the one or more files of the first group, and wherein, when determining that the two or more parts exist in the content of one file of the one or more files of the first group, the second determining determines that the type of the one the is log.

9. A device comprising: a memory; and a processor coupled to the memory and configured to: first-determine whether a character string, which is log, is included in attribute information of each of the plurality of files which are referred to or updated by a process that is being executed, classify the plurality of files into a first group of one or more files having the attribute information including the character string and a second group of one or more files not having the attribute information including the character string; second-determine whether a type of each of the one or more files of the first group is log by analyzing content of each of the one or more files of the first group prior to the second group, and output a determination result to determine whether the type of each of the one or more files of the first group is log regarding the plurality of files, wherein a processing to second-determine determines whether there are two or more parts in which another character string indicating date and time is provided in two continuous lines in the content of each of the one or more files of the first group, and wherein, when determining that the two or more parts exist in the content of one file of the one or more files of the first group, the second determining determines that the type of the one file is log.

* * * * *